United States Patent
Jang

(10) Patent No.: US 10,604,404 B2
(45) Date of Patent: Mar. 31, 2020

(54) LIQUID INJECTION SYSTEM FOR VEHICLE AND METHOD FOR CONTROLLING THE SAME

(71) Applicant: JIN SUNG ENG CO., LTD, Incheon (KR)

(72) Inventor: Kyung Bok Jang, Incheon (KR)

(73) Assignee: JIN SUNG ENG CO., LTD, Incheon (KR)

( * ) Notice: Subject to any disclaimer, the term of this patent is extended or adjusted under 35 U.S.C. 154(b) by 439 days.

(21) Appl. No.: 15/383,634

(22) Filed: Dec. 19, 2016

(65) Prior Publication Data

US 2017/0355590 A1   Dec. 14, 2017

(30) Foreign Application Priority Data

Jun. 10, 2016  (KR) .................. 10-2016-0072103

(51) Int. Cl.
| | |
|---|---|
| *B67D 7/38* | (2010.01) |
| *B60S 5/00* | (2006.01) |
| *B62D 65/00* | (2006.01) |
| *B67D 7/02* | (2010.01) |
| *B67D 7/04* | (2010.01) |

(52) U.S. Cl.
CPC ............... *B67D 7/38* (2013.01); *B60S 5/00* (2013.01); *B62D 65/005* (2013.01); *B67D 7/02* (2013.01); *B67D 7/04* (2013.01)

(58) Field of Classification Search
CPC .......... B67D 7/0401; B67D 2007/0403; B67D 7/02; B62D 65/00; B60R 17/00
See application file for complete search history.

(56) References Cited

U.S. PATENT DOCUMENTS

| | | | | |
|---|---|---|---|---|
| 4,708,175 A | * | 11/1987 | Janashak .............. | B25J 15/0019 141/1 |
| 2003/0164200 A1 | * | 9/2003 | Czeranna ............... | B62D 65/18 141/1 |
| 2016/0039548 A1 | * | 2/2016 | MacArthur ............. | B67D 7/42 141/1 |

FOREIGN PATENT DOCUMENTS

| | | |
|---|---|---|
| JP | 2010241494 | 10/2010 |
| KR | 10-2005-0023153 | 3/2005 |
| KR | 1020050023153 | 3/2005 |
| KR | 1020060053669 | 5/2006 |

* cited by examiner

*Primary Examiner* — Timothy P. Kelly
(74) *Attorney, Agent, or Firm* — STIP Law Group, LLC

(57) ABSTRACT

The present invention relates to a liquid injection system for a vehicle, including: at least one or more consoles adapted to check a leakage on a vehicle moved along a production line and to supply liquids to the vehicle; and a circulation rail having a working section disposed in parallel with the production line and a pit section in which the consoles are repaired and the liquids are refilled to the consoles, so as to allow the consoles to be circulated along the working section and the pit section thereof. accordingly, the liquid injection system can circulate the consoles using the track type circulation rail, thereby minimizing the time loss generated in liquid injection processes to improve the productivity of the vehicle.

3 Claims, 17 Drawing Sheets

FIG.16
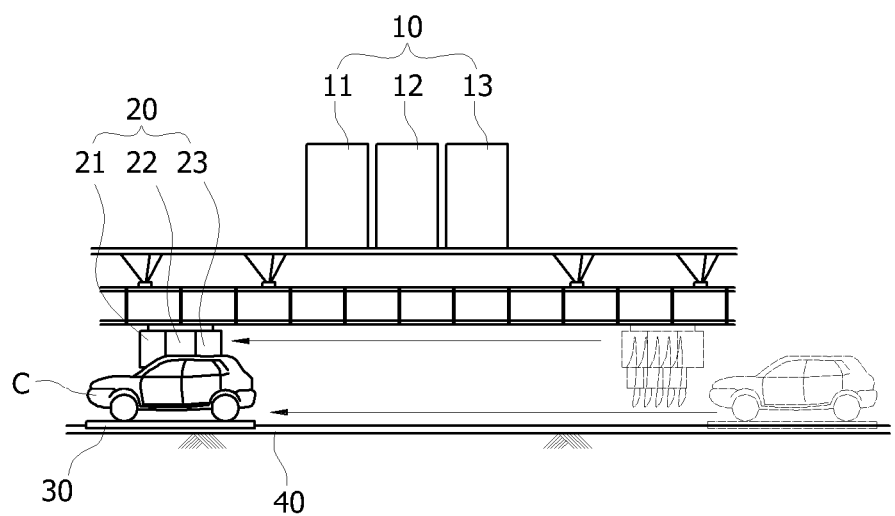
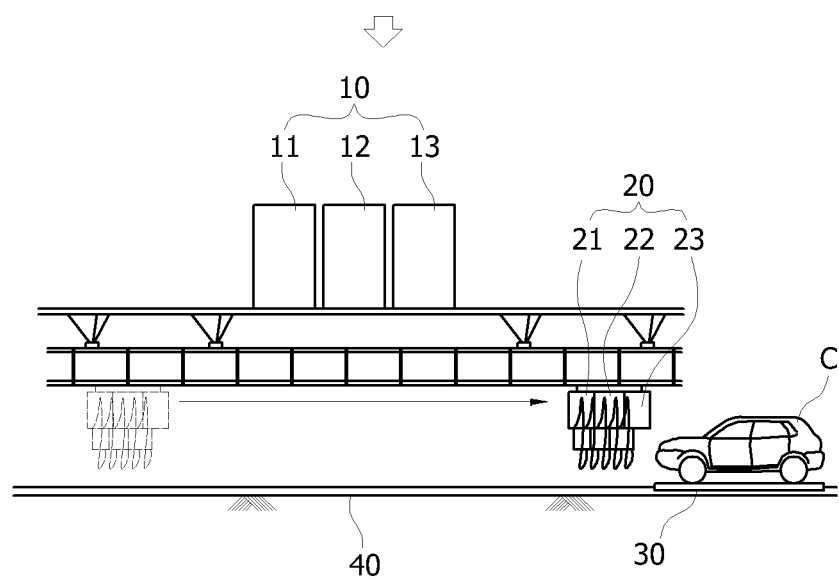

LIQUID INJECTION SYSTEM FOR VEHICLE AND METHOD FOR CONTROLLING THE SAME

CROSS REFERENCE TO RELATED APPLICATION(S)

This application claims priority from Korean Patent Application No. 10-2016-0072103 filed on Jun. 10, 2016 in the Korean Intellectual Property Office, and all the benefits accruing therefrom under 35 U.S.C. 119, the contents of which in its entirety are herein incorporated by reference.

BACKGROUND OF THE INVENTION

Field of the Invention

The present invention relates to a liquid injection system for a vehicle and a method for controlling the same, and more particularly, to a liquid injection system for a vehicle and a method for controlling the same that injects a variety of liquids such as a lubricant oil of an engine and a transmission, an antifreeze fluid, a brake fluid, a power pump operating oil, a washer liquid, an air conditioner refrigerant and so on, in a more rapid and gentle way, in the process of producing the vehicle.

Particularly, the present invention relates to a liquid injection system for a vehicle and a method for controlling the same that moves consoles in correspondence with vehicles advancing to a liquid injection process to allow liquids to be injected by means of the consoles and then circulates the consoles if the injection is finished to move the them to the advancing side to the liquid injection process, thereby minimizing the time consumed for the liquid injection processes to improve the productivity of the vehicles.

Background of the Related Art

If electric devices or interior parts of a vehicle body are completely assembled and mounted in the process of producing a vehicle, generally, a liquid injection process is carried out to inject a variety of liquids such as a lubricant oil of an engine and a transmission, an antifreeze fluid, a brake fluid, a power pump operating oil, a washer liquid, an air conditioner refrigerant and so on to the vehicle before the vehicle is conveyed to a finish line.

For example, the liquid injection process is carried out to inject the corresponding liquids to the vehicles, through a series of processes such as adaptor mounting on a reservoir, first vacuuming, large leakage checking, small leakage checking, second vacuuming, liquid injection/pressure leakage checking, top-off, scavenging, and adaptor demounting.

The liquid injection process is carried out through devices such as base units, consoles, adaptors as injection guns, a control panel, an operation panel and the like.

Referring to FIG. 16 showing a general liquid injection system for a vehicle, if a vehicle C advances to a liquid injection process in the state of being located on a work deck 30 moving along a production line 40, a console 20 being in a standby state at the advancing side is moved along the vehicle C to inject the corresponding liquid to the vehicle C, and if the injection is finished, the console 20 is moved backward to move the advancing side again.

In this case, the time corresponding to the time during which the console 20 after injection is moved backward to move the advancing side again is absolutely lost, so that the time consumed for the entire injection process is increased and the production process of the vehicle is also extended.

Besides, a base unit 10, which controls the console 20 and supplies liquids to the console 20, is large in volume, so that a spare space in which the base unit 10 is disposed does not actually exist in a working space, and accordingly, as shown in FIG. 16, the base unit 10 is disposed on an existing structure or a structure newly built in such a manner as to be located above the working space, thereby undesirably causing many difficulties in the installation and operation thereof.

So as to enhance the productivity of the existing liquid injection system, further, the components as shown in FIG. 16 are arranged on both sides of the vehicle C, as shown in FIG. 17, which undesirably requires a substantially large working space for the liquid injection process.

Further, as shown in FIG. 17, a base unit 11 for injecting a brake fluid, a base unit 12 for injecting an antifreeze fluid, and a base unit 13 for injecting an air conditioner refrigerant are connected to a console 21 for the brake fluid, a console 22 for the antifreeze fluid, and a console 23 for the air conditioner refrigerant through a number of hoses 50, electricity supply lines and control lines, so that as the consoles 21 to 23 arranged on both sides of the vehicle C are reciprocated, the hoses 50 or lines become entangled or damaged.

As another example of the conventional liquid injection system for a vehicle, furthermore, a brake fluid injection control system is disclosed in Korean Patent Application Laid-open No. 10-2005-0023153 to inject a given quantity of brake fluid into the vehicle, thereby improving the performance of a brake system. In addition thereto, like this, most of the conventional technologies related to the liquid injection process have suggest methods for injecting given quantities of liquids, and accordingly, they do not solve the problems of time loss and lowering of productivity generated in the liquid injection process.

SUMMARY OF THE INVENTION

Accordingly, the present invention has been made in view of the above-mentioned problems occurring in the prior art, and it is an object of the present invention to provide a liquid injection system for a vehicle and a method for controlling the same that that is capable of injecting a variety of liquids such as a lubricant oil of an engine and a transmission, an antifreeze fluid, a brake fluid, a power pump operating oil, a washer liquid, an air conditioner refrigerant and so on, in a more rapid and gentle way, in the process of producing the vehicle.

It is another object of the present invention to provide a liquid injection system for a vehicle and a method for controlling the same that is capable of minimizing the time loss generated in a liquid injection process and improving the productivity of the vehicle.

It is yet another object of the present invention to provide a liquid injection system for a vehicle and a method for controlling the same that is capable of moving consoles in correspondence with vehicles advancing to a liquid injection process to allow liquids to be injected by means of the consoles and thus circulates the consoles if the injection is finished to move them to the advancing side to the liquid injection process, thereby minimizing the time consumed for the liquid injection processes to improve the productivity of the vehicles.

To accomplish the above-mentioned objects, according to a first embodiment of the present invention, there is provided a liquid injection system for a vehicle including: at least one or more consoles adapted to check the leakage on vehicles moved along a production line and to supply liquids to the vehicles; and a circulation rail having a working section disposed in parallel with the production line and a pit section in which the consoles are repaired and the liquids are refilled to the consoles, so as to allow the consoles to be circulated along the working section and the pit section thereof.

According to the present invention, desirably, the circulation rail has the form of a track having two linear sections, any one of the two linear sections being disposed in parallel with the production line thus to form the working section, and the other of the two linear sections being disposed to have a liquid refilling region, in which a liquid refilling unit is located, and a repair region for the consoles, thus to form the pit section.

According to the present invention, desirably, the circulation rail includes a moving rail formed on at least a portion of the pit section in such a manner as to be moved together with the consoles, and the repair region comprises a repair rail connected to the moving rail through the movement of the moving rail.

According to the present invention, desirably, the pit section further includes a standby region in which the repaired or liquid-refilled consoles are in a standby state, so that if the consoles are moved to the repair region or the liquid refilling region, the consoles staying in the standby region instead of the consoles moved to the repair region or the liquid refilling region are moved to the working section.

According to the present invention, desirably, each console includes at least one of a main unit console moving along the circulation rail through power itself and a subunit console connected to the main unit console in such a manner as to be moved along the main unit console.

To accomplish the above-mentioned objects, according to a second embodiment of the present invention, there is provided a method for controlling a liquid injection system for a vehicle, the method including: the liquid injection step of moving at least one or more consoles along a working section of a circulation rail to supply liquids to vehicles moving along a production line; the console monitoring step of determining whether the consoles are normally operated; and the console pit in step of moving the consoles abnormally operated or needing liquid refilling to a pit section on the circulation rail.

According to the present invention, desirably, the console pit in step includes: the rail moving step of positioning the consoles abnormally operated or needing liquid refilling to a moving rail formed on the pit section of the circulation rail and moving the consoles together with the moving rail in such a manner as to be connected to a repair rail; and the pit in step of moving the consoles to the repair rail from the moving rail.

According to the present invention, desirably, the console pit in step includes: the standby console moving step of moving the consoles staying in a standby state to the moving rail; and the standby console input step of moving the consoles staying in the standby state together with the moving rail and returning the consoles to the circulation rail.

According to the present invention, desirably, the circulation rail includes a pit rail having both side ends connected thereto in such a manner as to pass through the pit section, the pit rail having a collection portion and an input portion formed on both side ends thereof, the pit section of the circulation rail having a liquid refilling region, a repair region and a standby region formed by spatially dividing the pit rail, and the console pit in step includes: the pit in step of collecting the consoles to the pit rail through the collection portion; the region moving step of moving the collected consoles to the repair region or the liquid refilling region; and the standby console input step of moving the consoles staying in the standby state to the circulation rail through the input portion.

According to the present invention, desirably, the console pit in step further includes: the collected position checking step of checking the collected positions of the consoles on the circulation rail after the region moving step; and the circulation speed checking step of checking the moving speeds of the consoles located on the circulation rail, and in the standby console input step, other consoles staying in the standby state are inputted to the checked collected positions of the circulation rail.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 16 and 17 are side and top views showing examples of a general liquid injection system for a vehicle.

DETAILED DESCRIPTION OF THE PREFERRED EMBODIMENT

Hereinafter, an explanation on a liquid injection system for a vehicle and a method for controlling the same according to the present invention will be in detail given with reference to the attached drawing.

Figure 1:
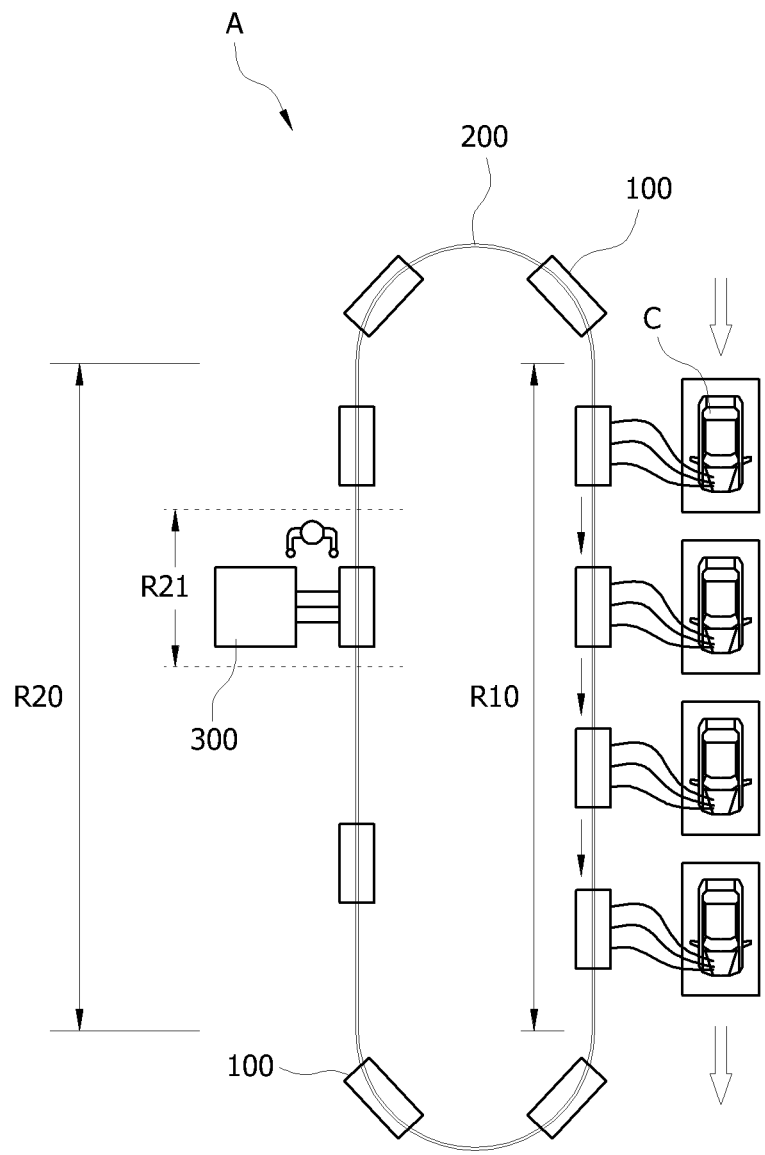
FIG. 1 is a top view showing the whole configuration of a liquid injection system for a vehicle according to a first embodiment of the present invention.

FIG. 1 is a top view showing the whole configuration of a liquid injection system for a vehicle according to a first embodiment of the present invention.

Referring to FIG. 1, a liquid injection system A for a vehicle according to a first embodiment of the present invention largely includes consoles 100 and a circulation rail

200. In this case, the movements of the consoles 100 are controlled by means of a separate control unit (not shown) or a portable terminal (for example, PDA, smart phone, a radio terminal for control and so on) of a worker, which are of course freely varied if there is a need from a person skilled in the art, and accordingly, they are not specially limited thereto.

The consoles 100 are adapted to check the leakage on the vehicles C moved along a production line and to supply liquids to the vehicles C, and as mentioned above, they conduct a series of liquid injection processes such as adaptor mounting on a reservoir, first vacuuming, large leakage checking, small leakage checking, second vacuuming, liquid injection/pressure leakage checking, top-off, scavenging, and adaptor demounting.

Further, the consoles 100 include modules for injecting a lubricant oil of an engine and a transmission, an antifreeze fluid, a brake fluid, a power pump operating oil, a washer liquid, an air conditioner refrigerant and so on (hereinafter, they are referred to as injection liquids) to the vehicles C, and of course, a control unit, display, alarms and lamps for the modules are mounted on the consoles 100. In this case, the modules are detachably mounted on the consoles 100 according to the injection liquids, so that the injection liquids can be selected under the needs on the process lines.

According to the present invention, on the other hand, as the consoles 100 are modularized and mounted according to the injection liquids, the injection liquids are stored by small amounts in the consoles 100, and accordingly, as shown in FIG. 1, a liquid refilling unit 300 is additionally disposed to refill the corresponding injection liquids to the consoles 100 if necessary.

The circulation rail 200 is periodically rotatable and includes a working section R10 disposed in parallel with a production line (which is a box type arrow in FIG. 1) and a pit section R20 in which the consoles 100 are repaired and the injection liquids are refilled to the consoles 100.

Accordingly, the consoles 100 are circulated along the working section R10 and the pit section R20.

For example, as shown in FIG. 1, the circulation rail 200 is configured to the form of a track wherein any one (the right side linear section of FIG. 1) of two linear sections is disposed in parallel with the production line to form the working section R10.

Also, the circulation rail 200 is configured wherein any one (the left side linear section of FIG. 1) of two linear sections is disposed to have a liquid refilling region R21 in which the liquid refilling unit 300 is located thus to form the pit section R10.

According to the present invention, accordingly, the liquid injection system A injects various kinds of liquids into the vehicles C using the consoles 100 circulated along the circulation rail 200, and if necessary, refills the corresponding injection liquids to the consoles 100 on the liquid refilling region R21 of the circulation rail 200. If it is not necessary to refill the injection liquids, at this time, the consoles 100 pass over the liquid refilling region R21 and are just moved to the working section R10.

At this time, the consoles 100 are moved to the working section R10 in such a manner as to correspond to the vehicles C moving along the production line. In more detail, if the liquid injection operations of the consoles 100 are finished, the consoles 100 rapidly advance to the pit section R20 and are subjected to injection liquid refilling from the liquid refilling unit 300 if necessary. After that, the consoles 100 are in a standby state on the end portion (the upper portion of FIG. 1) of the pit section R20, and if the vehicle C enters the production line, the consoles 100 are moved to the working section R20 in correspondence with the advancing position of the vehicle C.

Accordingly, the liquid injection system A according to the first embodiment of the present invention is configured to allow the consoles 100 to conduct the liquid injection, while moving the consoles 100 in correspondence with the moving speeds of the vehicles C, and to allow the consoles 100 after the liquid injection is finished to be circulated to conduct the liquid injection again, so that the time loss caused by the returning operations of the consoles 100 can be prevented in advance and the productivity of the vehicles can be improved.

Figure 2:
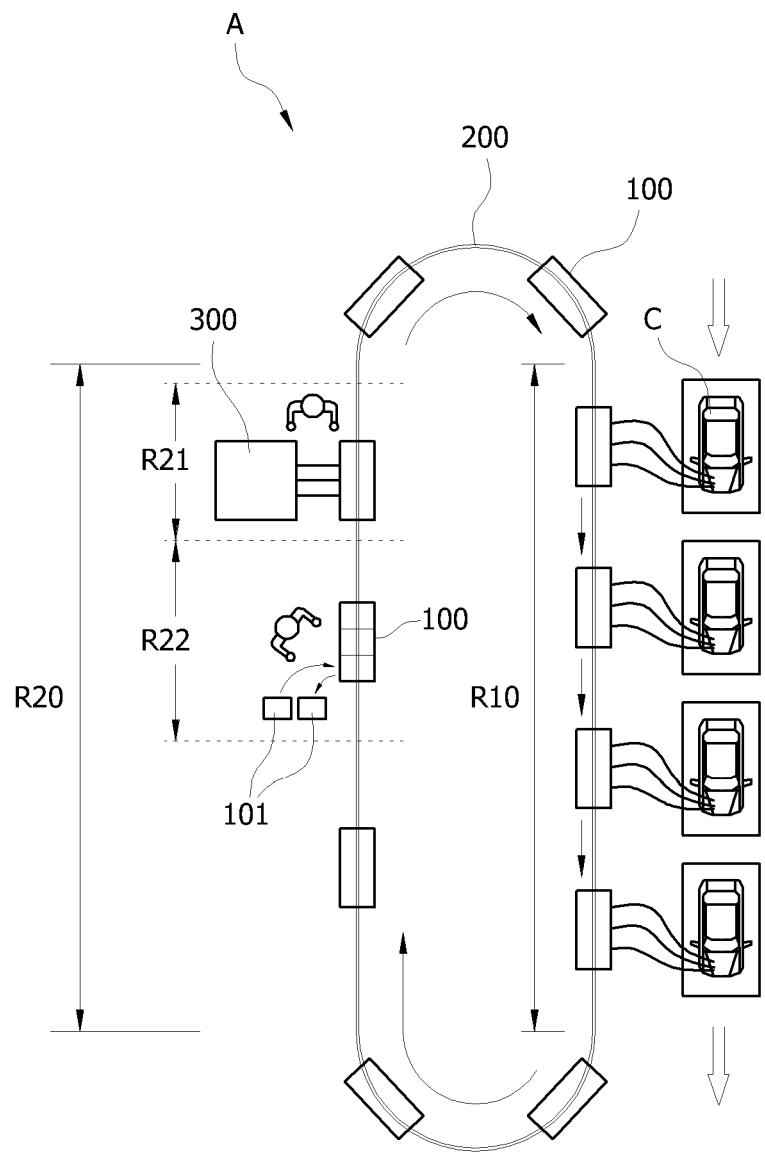
FIG. 2 is a top view showing the whole configuration of a liquid injection system for a vehicle according to a second embodiment of the present invention.

FIG. 2 is a top view showing the whole configuration of a liquid injection system for a vehicle according to a second embodiment of the present invention.

As shown in FIG. 2, a liquid injection system A for a vehicle according to a second embodiment of the present invention includes a pit section R20 of a circulation rail 200 in which both of a liquid refilling region R21 and a repair region R22 for repairing consoles 100 are formed.

If the consoles 100 fail, accordingly, they can be rapidly repaired on the repair region R22, and after repaired, they are moved just to the working section R10.

Further, as shown in the repair region R22 of FIG. 2, each console 100 is configured to have at least one liquid supply module 101 detachably mounted thereon to contain the corresponding liquid to the kind of liquid to be supplied therein, so that the liquid supply module 101 in which the injection liquid needed by the worker is contained is selected and mounted on the console 100.

Hereinafter, a method for controlling the liquid injection system A for a vehicle according to the present invention will be in detail described.

Figure 3:
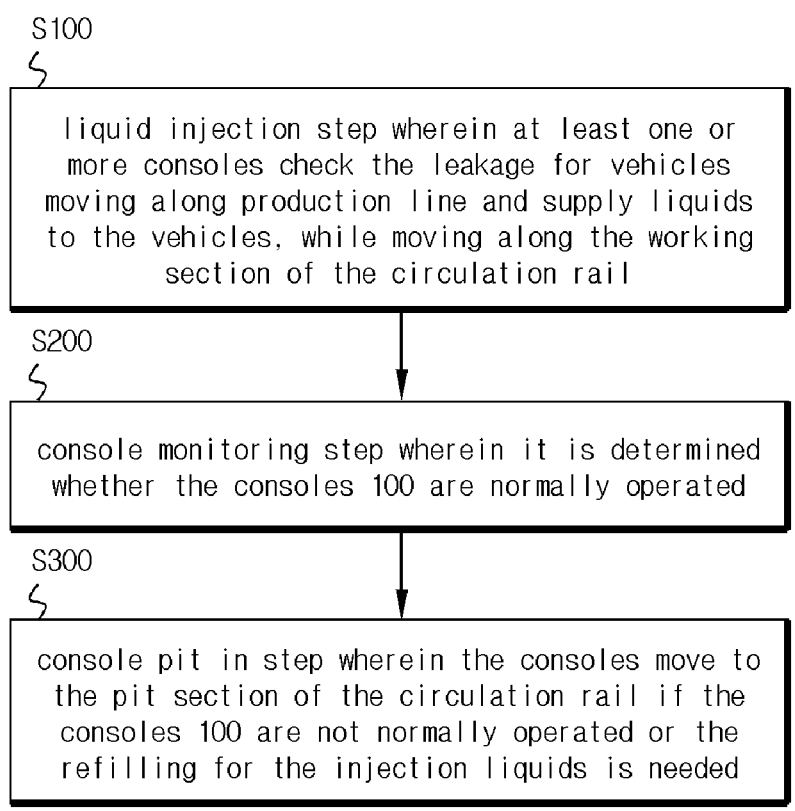
FIG. 3 is a flow chart showing a method for controlling a liquid injection system for a vehicle according to the second embodiment of the present invention.

FIG. 3 is a flow chart showing a method for controlling a liquid injection system for a vehicle according to the second embodiment of the present invention.

Referring to FIG. 3, a method for controlling the liquid injection system A for a vehicle according to the second embodiment of the present invention includes a liquid injection step S100, a console monitoring step S200 and a console pit in step S300.

In the liquid injection step S100, as shown in FIG. 1, at least one or more consoles 100 check the leakage for the vehicles C moving along the production line, while moving along the working section R10 of the circulation rail 200, and then supply the injection liquids to the vehicles C if no leakage exists.

In the console monitoring step S200, next, it is checked whether the injection liquids remain in the consoles 100 or the consoles 100 are normally operated in the process where the consoles 100 are circulated along the circulation line 200, while conducting the liquid injection step S100.

In the console pit in step S300, after that, the consoles 100 move to the pit section R20 of the circulation rail 200 if the consoles 100 are not normally operated or the refilling for the injection liquids is needed, and the injection liquids are refilled to the consoles 100 by means of the liquid refilling unit 300 or the repairing for the consoles 100 is carried out, as shown in FIG. 2.

Figure 4:
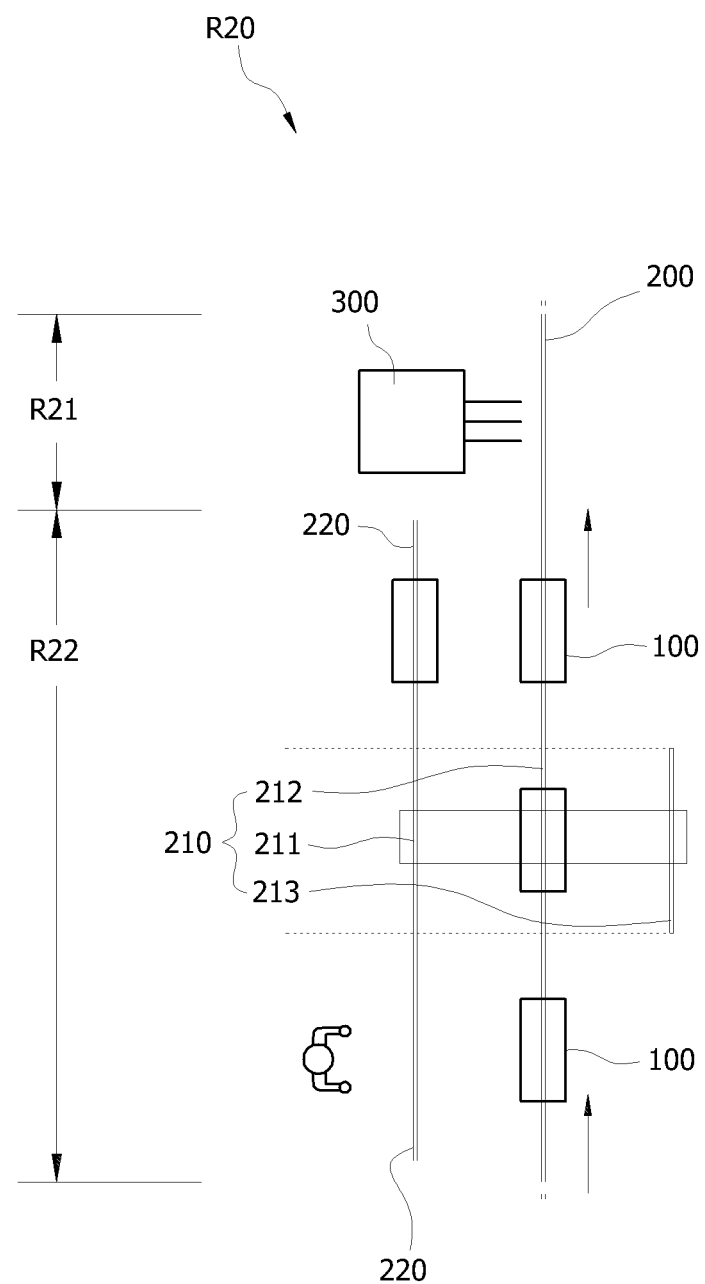
FIG. 4 is a top view showing the whole configuration of a liquid injection system for a vehicle according to a third embodiment of the present invention.

FIG. 4 is a top view showing the whole configuration of a liquid injection system for a vehicle according to a third embodiment of the present invention.

Referring to FIG. 4, a liquid injection system for a vehicle according to a third embodiment of the present invention includes a circulation rail 200 having a moving rail 210 formed on at least a portion of a pit section R20, along which consoles 100 are moved together.

Accordingly, the moving rail 210 is moved to a side direction along the dotted line of FIG. 4 in such a manner as to be connected to a repair rail 220 formed on a repair region R22.

In more detail, the moving rail 210 includes first to third moving rails 211 to 213 parallel with each other. As the moving rail 210 moves, any one of the first to third moving rails 211 to 213 is connected to the repair rail 220, any one thereof is connected to the circulation rail 200, and the other thereof is maintained in a separate state from the repair rail 220 and the circulation rail 200.

Accordingly, the first to third moving rails 211 to 213 of the moving rail 210 are reciprocated between the circulation rail 200 and the repair rail 220 to move the consoles 100 along the circulation rail 200 or to repair the consoles 100.

Now, the operation process of the moving rail 210 will be in more detail explained.

Figure 5:
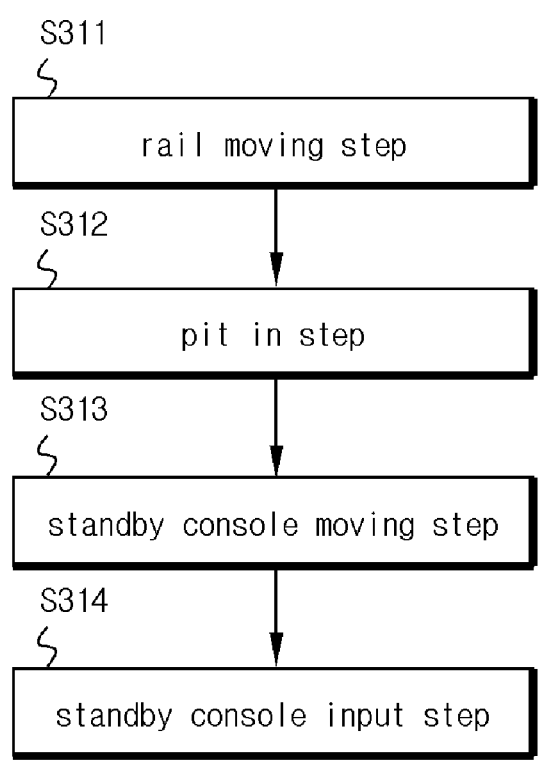
FIG. 5 is a flow chart showing the step S300 of FIG. 3 applied to the liquid injection system of FIG. 4.

FIG. 5 is a flow chart showing the step S300 of FIG. 3 applied to the liquid injection system of FIG. 4, and FIGS. 6 to 9 are top views showing the operations of the liquid injection system of FIG. 4 through the steps of FIG. 5. Referring to FIGS. 5 to 9, the explanation on the step S300 will be explained below, while avoiding the explanation on the steps S100 and S200 of FIG. 3.

Figure 6:
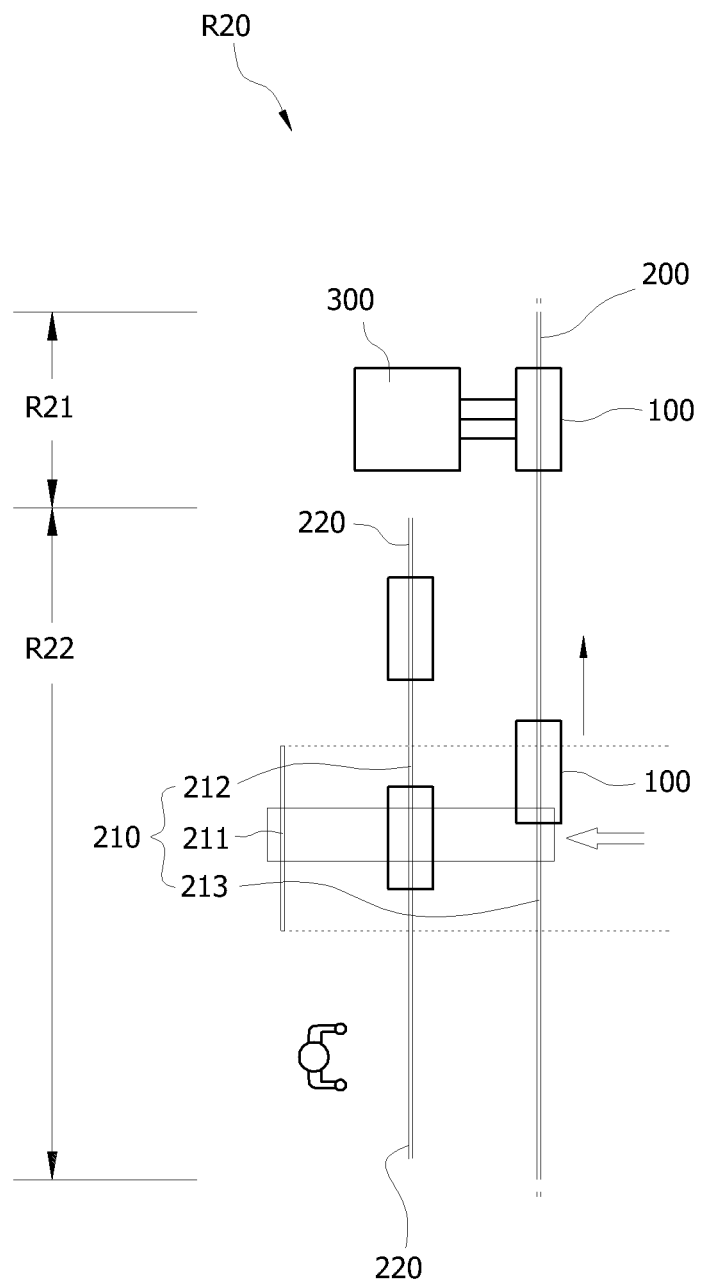
FIGS. 6 to 9 are top views showing the operations of the liquid injection system of FIG. 4 through the steps of FIG. 5.

Referring to FIG. 6, if one console 100 from which abnormality is generated is located on the second moving rail 212 of the moving rail 210 as shown in FIG. 4, the second moving rail 212 of the moving rail 210 is moved to the repair region R22 at step S311.

In more detail, if one console 100 from which abnormality is generated is moved to the pit region R20 of the circulation rail 200, the corresponding console 100 becomes located on the second moving rail 212 of the moving rail 210 formed in the pit region R20 and is then moved together with the moving rail 210, so that as shown in FIG. 6, the second moving rail 212 is connected to the repair rail 220.

Figure 7:
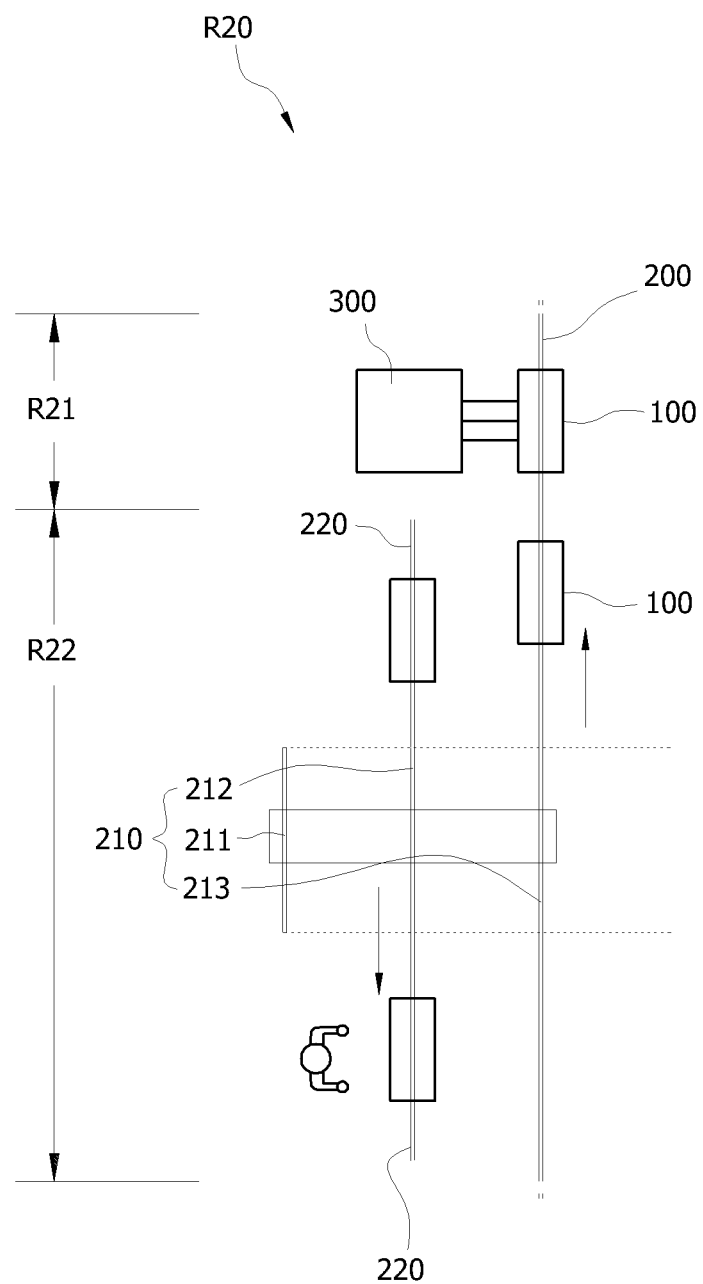

As shown in FIG. 7, the console 100, which is located on the moving rail 210 connected to the repair rail 220, is moved to the repair rail 220 and then repaired by the worker at step S312.

Next, the third moving rail 213 of the moving rail 210 is connected to the circulation rail 200, and the consoles 100 on the circulation rail 200 are normally moved.

Figure 8:
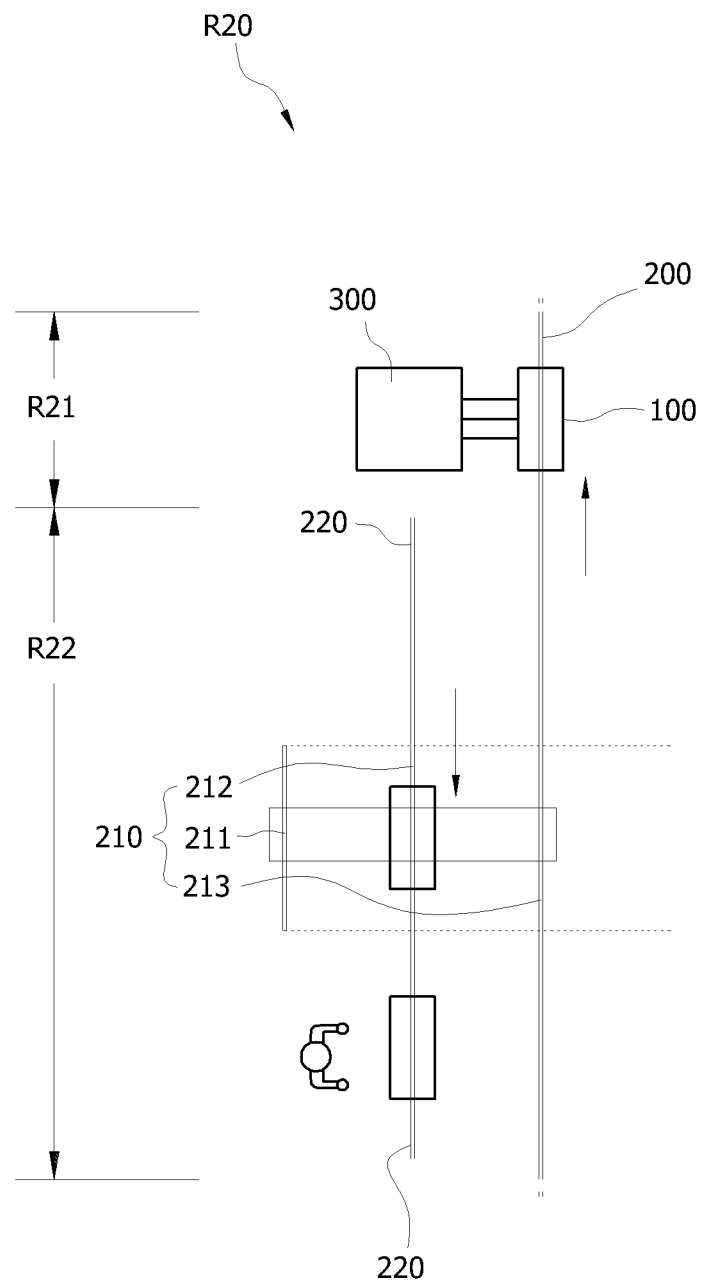
Figure 9:
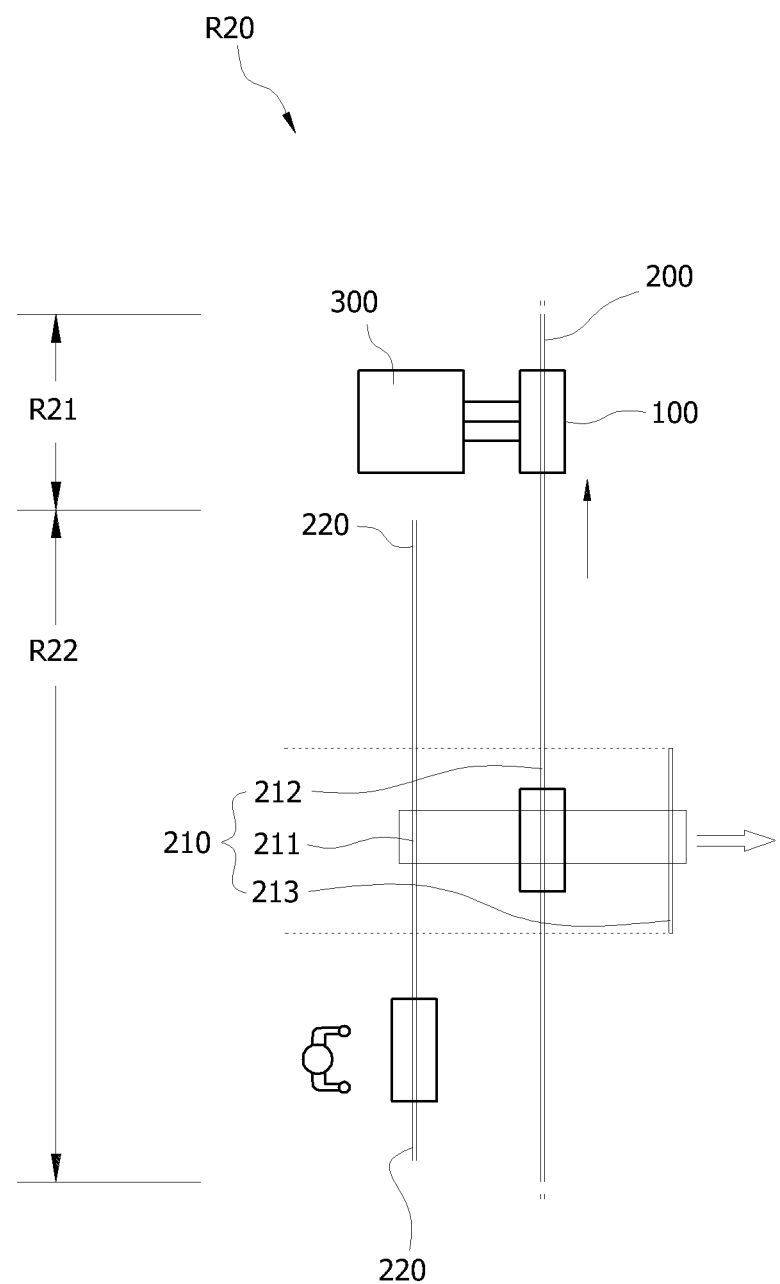

At this time, as shown in FIG. 7, if there is another console 100 normally operable on the repair rail 220, the normally operable console 100 is moved to the second moving rail 212 of the moving rail 210 at step S313, as shown in FIG. 8, and the moving rail 210 is then moved to allow the second moving rail 212 to be connected to the circulation rail 200, as shown in FIG. 9, so that the normally operable console 100 can advance to the working section R10.

Further, as shown in FIGS. 7 and 8, the repaired console 100 is moved to one side (for example, the upper side of the moving rail 210 in FIG. 4 and FIGS. 6 to 9) of the system along the first moving rail 211 of the moving rail 210 and is then in a standby state on the first moving rail 211. After that, if another console 100 becomes abnormal, the abnormal console 100 is exchanged with the repaired console 100 and thus moved to the circulation rail 200.

Accordingly, the abnormal console 100 is rapidly exchanged with the repaired console 100, so that the liquid injection process can be gently carried out.

Further, a period of time capable of repairing the abnormal console 100 is sufficiently ensured to minimize the number of times of the generation of abnormal consoles, so that the liquid injection system can be operated stably and reliably.

Figure 10:
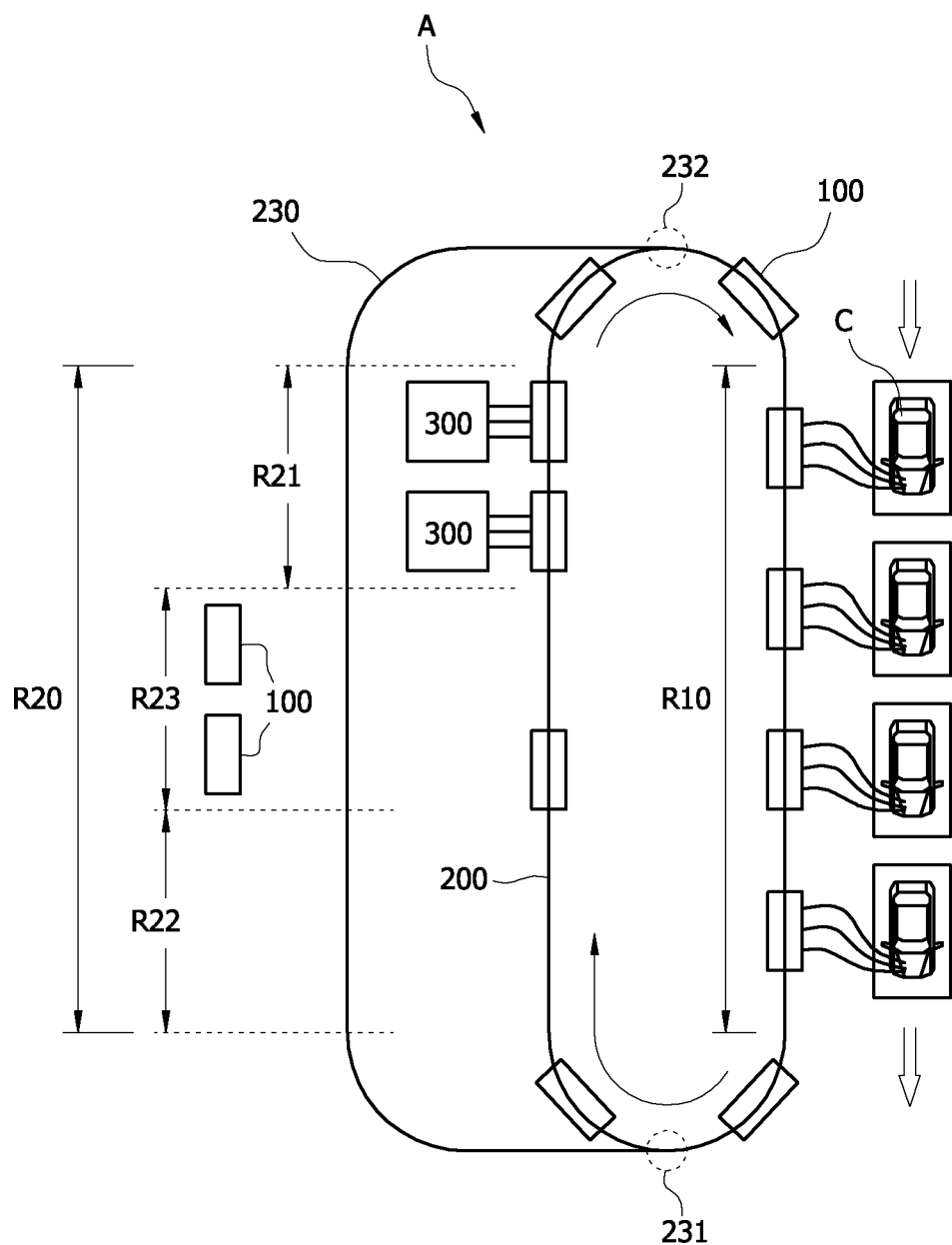
FIG. 10 is a top view showing the whole configuration of a liquid injection system for a vehicle according to a fourth embodiment of the present invention.

FIG. 10 is a top view showing the whole configuration of a liquid injection system for a vehicle according to a fourth embodiment of the present invention.

Referring to FIG. 10, a liquid injection system A for a vehicle according to a fourth embodiment of the present invention is configured wherein a pit rail 230 is connected on both side ends thereof to a circulation rail 200 and a collection portion 231 and an input portion 232 are formed on both side ends of the pit rail 230 in a rail branching way.

The pit rail 230 is utilized as a pit section R20 that is spatially divided into a liquid refilling region R21, a repair region R22 and a standby region R23.

Figure 12:
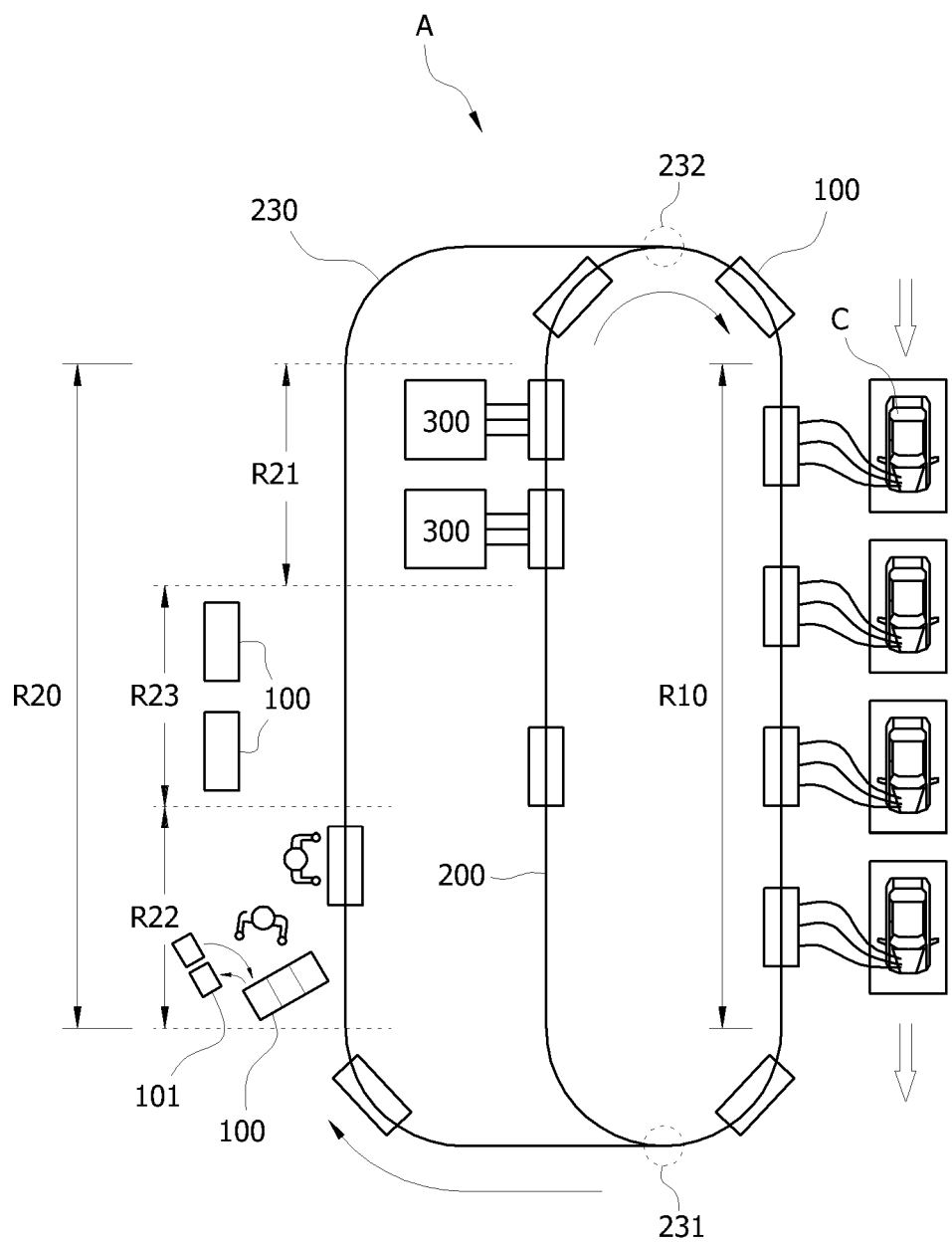
FIGS. 12 to 14 are top views showing the operations of the liquid injection system of FIG. 10 through the steps of FIG. 11.
Figure 14:
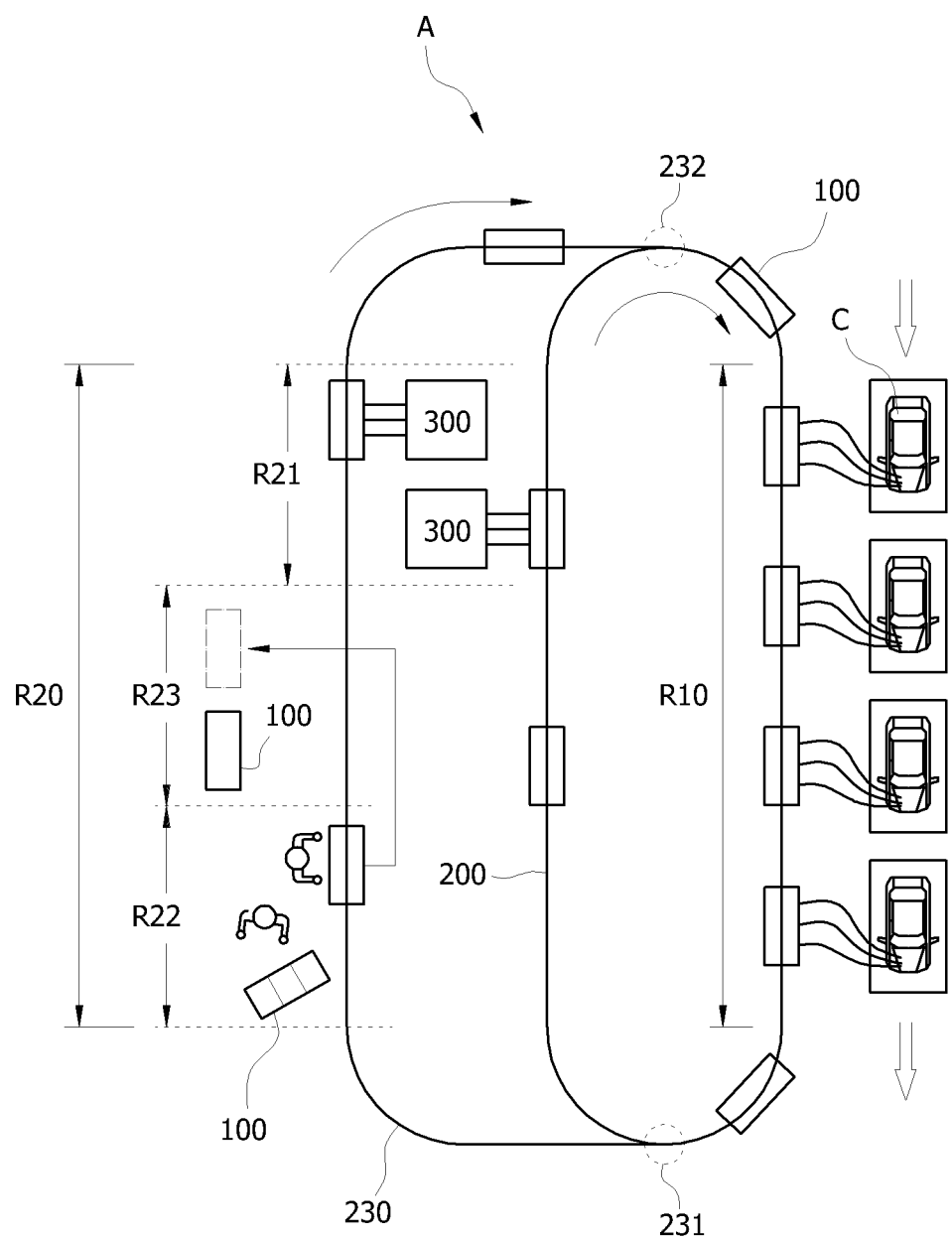

At this time, as shown in FIG. 12, the liquid refilling region R21 is formed on the pit section R20 of the circulation rail 200, but as shown in FIG. 14, liquid refilling is carried out even for the consoles 100 moved to the liquid refilling region R21. Of course, the liquid refilling is carried out for the consoles 100 only in the liquid refilling region R21 according to the need of a person skilled in the art, and accordingly, it is not limited particularly thereto.

According to the present invention, therefore, the liquid refilling region R21 is formed on at least one of a portion (the upper side of FIG. 12) of the pit rail 230 and a portion (the upper portion of the pit section of FIG. 12) of the circulation rail 200.

Accordingly, the liquid injection system A as shown in FIG. 10 is configured wherein if one console 100 circulated along the circulation rail 200 is moved to the repair region R22, another console 100 staying on the standby region R23, instead of the console 100 moved to the repair region R22, is moved to the working section R10.

Now, the above process of the liquid injection system A will be in more detail explained.

Figure 11:
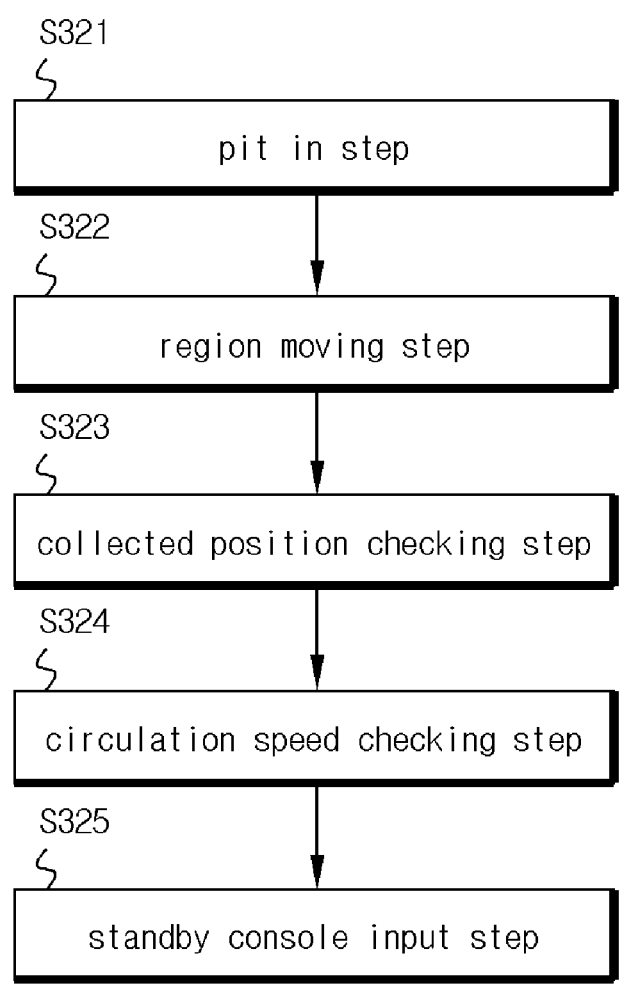
FIG. 11 is a flow chart showing the step S300 of FIG. 3 applied to the liquid injection system of FIG. 10.

FIG. 11 is a flow chart showing the step S300 of FIG. 3 applied to the liquid injection system of FIG. 10, and FIGS. 12 to 14 are top views showing the operations of the liquid injection system of FIG. 10 through the steps of FIG. 11.

Referring to FIG. 12, if the consoles 100 circulated along the circulation rail 200 are abnormally operated, the abnormally operated consoles 100 are collected to the pit rail 230 through the collection portion 231 at step S321.

At this time, the positions of the collected consoles 100 on the circulation rail 200 are checked at step S323, and the moving speeds of the corresponding consoles 100 on the circulation rail 200 are recognized at step S324 to allow the collected positions of the consoles 100 to be continuously checked.

Next, the collected consoles 100 are moved to the repair region R22 and are then repaired therein at step S322.

Referring further to FIG. 12, the liquid supply modules 101 of the consoles 100 can be exchanged on the repair region R22.

Figure 13:
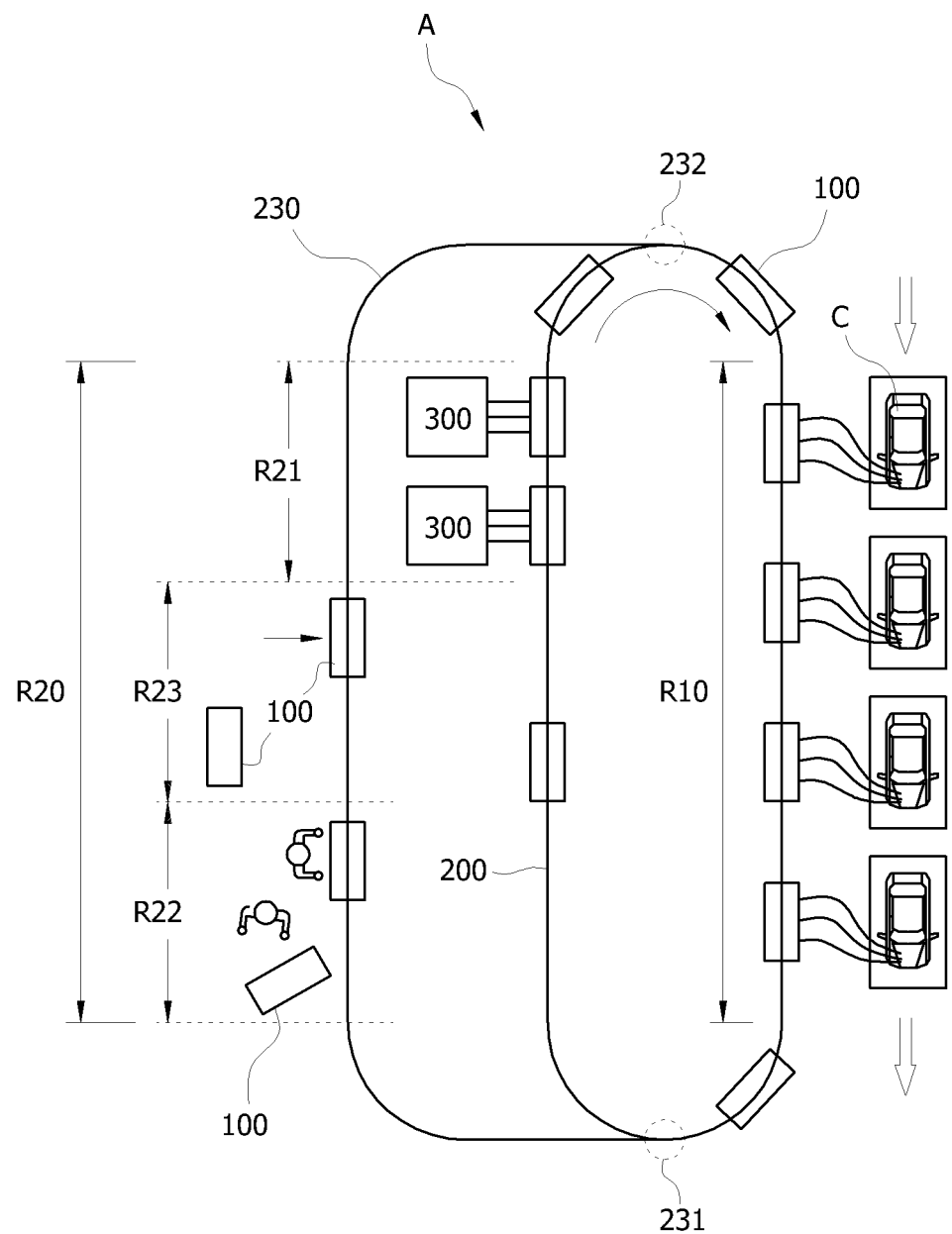

If the collected positions of the consoles 100 on the circulation rail 200 are continuously moved and thus approach the input portion 232, in the process wherein the collected consoles 100 are repaired in the repair region R22, as shown in FIG. 13, another normal console 100 staying in the standby region R23 is moved to the pit rail 230 and becomes then in a standby state.

If the collected positions are close to the input portion 232, next, the consoles 100 being in the standby state on the pit rail 230 are moved to the circulation rail 200 through the input portion 232 at step S325, as shown in FIG. 14.

Accordingly, the consoles 100 are efficiently circulated using the track type circulation rail 200, so that the time loss generated in the liquid injection process of the vehicle production line is reduced, the time consumed for the whole production process is minimized, and the productivity of the vehicles is improved.

Figure 15A:
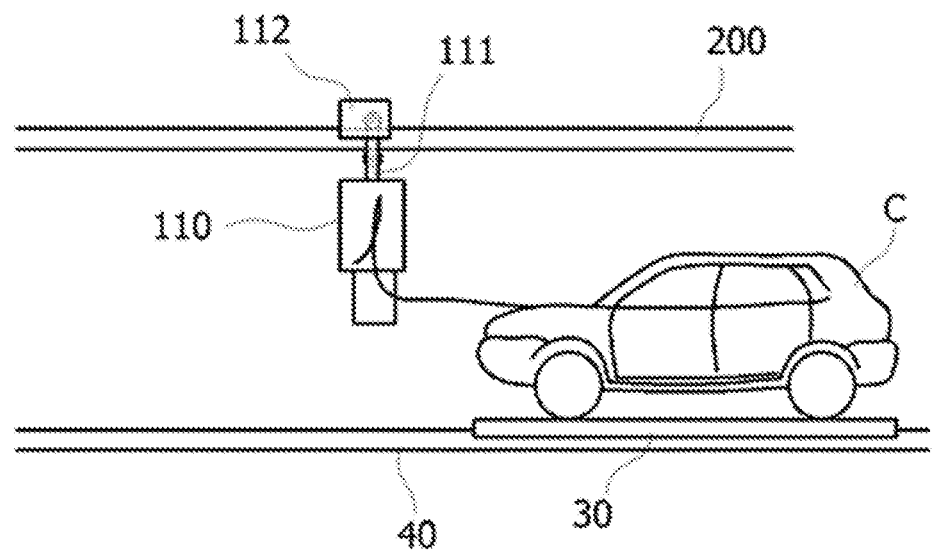
FIGS. 15a and 15b are side views showing a console of the liquid injection system according to the present invention.
Figure 15B:
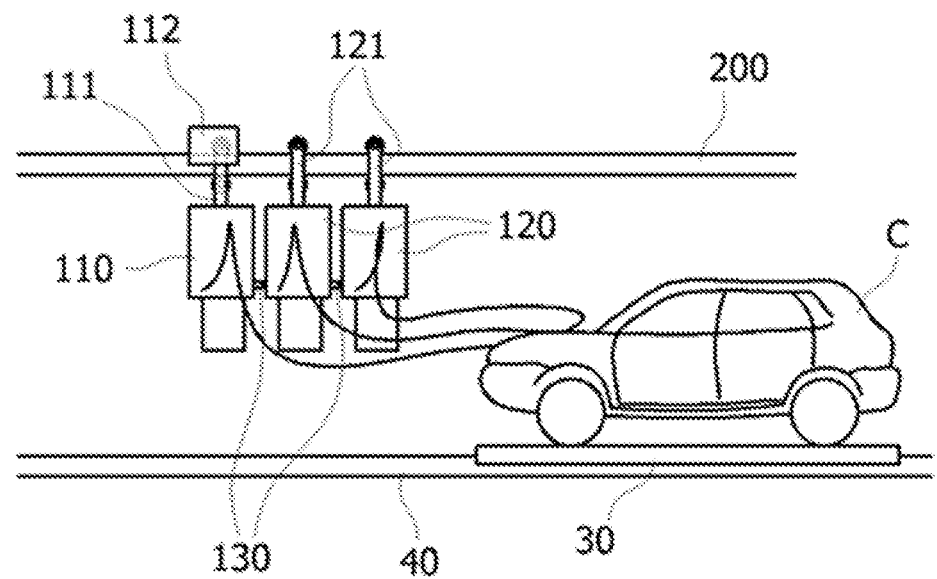
Figure 17:
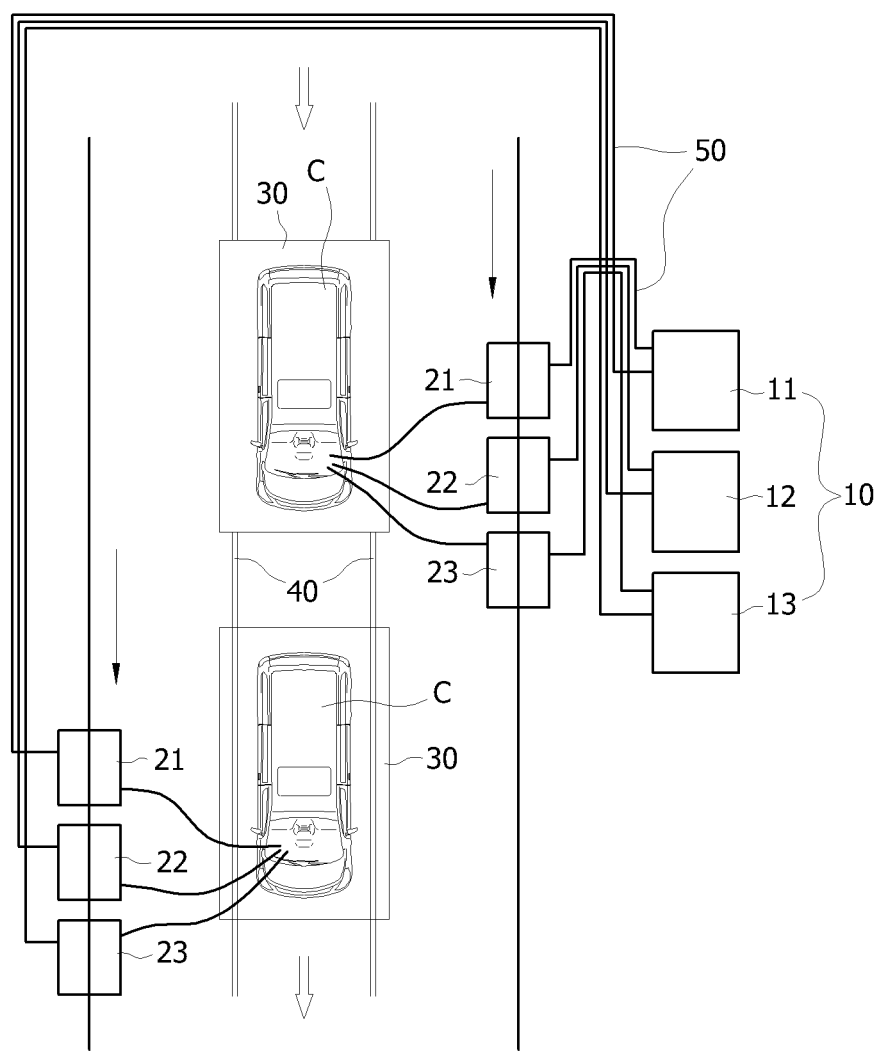

FIGS. 15a and 15b are side views showing a console of the liquid injection system according to the present invention.

Referring to FIGS. 15a and 15b, the console 100 includes at least one unit console. In more detail, the console 100 includes a main unit console 110 moving along the circulation rail 200 through the power itself.

Further, the console 100 includes at least one or more subunit consoles 120 connected to the main unit console 110 in such a manner as to be moved along the main unit console 110, which may be provided according to the demand of the person skilled in the art.

For example, as shown in FIG. 15a, the injection liquid can be injected using one main unit console 110. At this time, the main unit console 110 is movably coupled to a moving rail R by means of a support roller 111 and is moved by means of the operation of a driver 112.

If there is a need to inject different kinds of injection liquids from the injection liquid of the main unit console 110, as shown in FIG. 15b, the subunit consoles 120 having the number demanded are additionally connected to the main unit console 110. At this time, the subunit consoles 120 do not require any separate driver, and they are movably coupled to the moving rail R by means of support rollers 111, while being connected to the main unit console 111 or other subunit consoles 120 by means of connectors 130.

As described above, the liquid injection system and the method for controlling the liquid injection system according to the present invention can inject a variety of liquids such as a lubricant oil of an engine and a transmission, an antifreeze fluid, a brake fluid, a power pump operating oil, a washer liquid, an air conditioner refrigerant and so on, in a more rapid and gentle way, in the process of producing the vehicle.

Particularly, the liquid injection system and the method for controlling the liquid injection system according to the present invention can circulate the consoles using the track type circulation rail, thereby minimizing the time loss generated in liquid injection processes to improve the productivity of the vehicle.

More particularly, the liquid injection system and the method for controlling the liquid injection system according to the present invention can move the consoles in correspondence with the vehicles advancing to the liquid injection process to allow liquids to be injected by means of the consoles and circulate the consoles if the injection is finished to move them to the advancing side to the liquid injection process, thereby minimizing the time consumed for the liquid injection process to improve the productivity of the vehicles.

Further, the liquid injection system and the method for controlling the liquid injection system according to the present invention can ensure sufficient working performance just through the formation on one side of the vehicles conveyed, so that the installation area can be more reduced than that in the conventional practices in which the liquid injection system are disposed on both sides of the vehicle, respectively, thereby minimizing the area of the whole working space needed for the liquid injection process.

Accordingly, the liquid injection system and the method for controlling the liquid injection system according to the present invention can perform various operations required on the production line of vehicles in a gentle manner and can be applied efficiently to a variety of production lines for vehicles, even while having no special design change, so that the liquid injection system can be easily applied both to the production line currently operated and to the production line to be built later, thereby greatly improving the utilization of space.

Further, the liquid injection system and the method for controlling the liquid injection system according to the present invention can improve the reliability and competitiveness in the fields of vehicle manufacturing, vehicle producing facilities and systems, liquid injection systems and the fields similar or related thereto.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

It should be therefore understood that the embodiments of the present invention are just exemplary and are not intended to restrict the present invention.

What is claimed is:

1. A liquid injection system for a vehicle, comprising:
   at least one or more consoles adapted to check a leakage on a vehicle moved along a production line and to supply liquids to the vehicle; and
   a circulation rail having a working section disposed in parallel with the production line and a pit section in which the consoles are repaired and the liquids are refilled to the consoles, so as to allow the consoles to be circulated along the working section and the pit section thereof,
   wherein the circulation rail has the form of a track having two linear sections, any one of the two linear sections being disposed in parallel with the production line thus to form the working section, and the other of the two linear sections being disposed to have a liquid refilling region, in which a liquid refilling unit is located, and a repair region for the consoles, thus to form the pit section, and
   wherein the pit section further comprises a standby region in which the repaired or liquid-refilled consoles are in a standby state, so that if the consoles are moved to the repair region or the liquid refilling region, the consoles staying in the standby region instead of the consoles moved to the repair region or the liquid refilling region are moved to the working section.

2. The liquid injection system according to claim 1, wherein the circulation rail comprises a moving rail formed on at least a portion of the pit section in such a manner as to be moved together with the consoles, and the repair region comprises a repair rail connected to the moving rail through the movement of the moving rail.

3. The liquid injection system according to claim 1, wherein each console comprises at least one of a main unit console moving along the circulation rail through power itself and a subunit console connected to the main unit console in such a manner as to be moved along the main unit console.

* * * * *